United States Patent [19]
Yamaga et al.

[11] 3,938,345
[45] Feb. 17, 1976

[54] COOLING METHOD BY USE OF CORONA DISCHARGE

[75] Inventors: Joji Yamaga; Morio Jido, both of Tokyo, Japan

[73] Assignee: Agency of Industrial Science & Technology, Tokyo, Japan

[22] Filed: Oct. 3, 1974

[21] Appl. No.: 511,725

[30] Foreign Application Priority Data
Oct. 6, 1973  Japan.............................. 48-112559

[52] U.S. Cl. ...................... 62/3; 165/1; 62/467 PR
[51] Int. Cl.² ......................................... F25B 21/02
[58] Field of Search................................ 62/3; 165/1

[56] References Cited
UNITED STATES PATENTS

| | | | |
|---|---|---|---|
| 2,372,314 | 3/1945 | Canetta | 165/24 |
| 2,604,936 | 7/1952 | Kaehni | 432/9 |
| 2,605,377 | 7/1952 | Kaehni | 219/281 |
| 2,765,975 | 10/1956 | Lindenblad | 315/111.9 |
| 2,992,177 | 7/1961 | Morrisson | 62/3 |
| 3,071,705 | 1/1963 | Coleman | 62/3 |
| 3,224,485 | 12/1965 | Blomgren | 432/24 |
| 3,224,497 | 12/1965 | Blomgren | 62/3 |
| 3,448,791 | 6/1969 | Clark | 165/1 |
| 3,681,896 | 8/1972 | Velkoff | 62/71 |

*Primary Examiner*—William J. Wye
*Attorney, Agent, or Firm*—Kurt Kelman

[57] ABSTRACT

In cooling an article by the phenomenon of corona discharge caused when the article is placed opposite a high-potential electrode, a high electric potential is applied between the article and the electrode. This invention contemplates interposing a corona focusing ring between the article and the high-potential electrode. When high electric potential is also applied to the corona focusing ring, the avalanche of ions generated by the electrode in consequence of corona discharge is focused upon the article by the corona focusing ring, with the result that local cooling is effected on the article.

2 Claims, 5 Drawing Figures

COOLING METHOD BY USE OF CORONA DISCHARGE

BACKGROUND OF THE INVENTION

This invention relates to a method for locally cooling an article by means of corona discharge.

It has already been suggested to cool part of an article by placing the article opposite a high-potential electrode and causing corona discharge therebetween.

For example, U.S. Pat. No. 3,224,497 discloses a method and apparatus for lowering the temperature of an electrically or flame heated body.

An object of the present invention is to provide a method for cooling an article by corona discharge, which method is directed to effectively cooling a local part of the article.

SUMMARY OF THE INVENTION

To attain the object described above according to this invention, there is provide a method for cooling an article by corona discharge caused by placing the article opposite a high-potential electrode and applying high electric potential between the article and the high-potential electrode, which method is characterized by interposing between the article subjected to cooling and the electrode a corona focusing ring possessed of a central hole defining a centrally inclined upper face such that when high electric potential is applied between the said electrode and the corona focusing ring and the article to generate corona discharge therebetween, the avalanche of ions generated by the electrode in consequence of the corona discharge is focused in the direction of the central hole by the inclined upper face of the said corona discharge ring to be released through the central hole onto the article. Consequently the impinging ions effect local cooling of the article. Since the avalanche of ions is concentrated as described above, this method permits effective cooling of a local part of the article.

Other objects and characteristic features of the present invention will become apparent from the description to be given in further detail herein below with reference to the accompanying drawings.

DETAILED DESCRIPTION OF THE INVENTION

Figure 1:
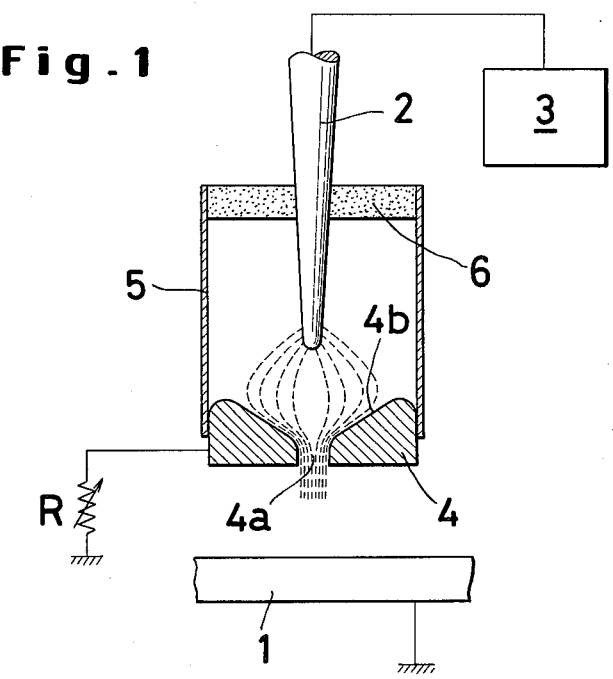
FIG. 1 is a sectional side elevation illustrating one preferred embodiment of the apparatus for practicing the method of this invention.

With reference to FIG. 1, an electrode 2 is placed opposite an article 1 subjected to cooling, with the article 1 connected to a plus terminal and the electrode 2 to a minus terminal respectively of a power source 3. The forward portion of the electrode 2 is surrounded by a cylindrical cover 5 made of an insulating material and the forward edge of the cover 5 is inserted around a corona focusing ring 4 provided at the center with a hole 4a. The corona focusing ring 4 is grounded via a resistance R. The center of the hole 4a of the corona focusing ring 4 exactly coincides with the axis of the electrode 2. The inner face of the corona focusing ring 4 diverges from the central hole to form a centrally inclined face 4b. The inclined face 4b is finished in mirror smoothness and fabricated so that no sharp corners are formed at the upper and lower edges of the face. The rear edge of the cylindrical cover 5 is closed with an annular filter-like electric insulating member 6 which permits free passage of air. In an arrangement in which the electrode 2 and the corona focusing ring 4 are disposed in the aforementioned relationship with the article 1 subjected to cooling, when high electric potential is applied between the electrode 2 and the corona focusing ring 4 and the article 1, there is generated corona discharge of a pattern determined chiefly by the shape of the extremity of the electrode 2 as indicated by the dotted lines of FIG. 1. The corona focusing ring 4 disposed between the electrode 2 and the article 1 subjected to cooling has a construction such that the ring has an outside diameter large enough to encompass the area in which the said corona discharge occurs and the inclined face 4b of mirror finish causes the avalanche of ions generated in consequence of the corona discharge to be focused in the direction of the central hole 4a and consequently released past the central hole 4a onto the article 1.

When the method of this invention is utilized for cooling the edge of a cutting tool, for example, there is a possibility that scrapings removed from a work blank by the cutting tool will fly through the central hole 4a of the corona focusing ring 4 into the space inside the cover 5. Such foreign matter can cause spark discharge. It is, therefore, desirable that entry of such foreign matter be prevented by spreading across the central hole 4a a metallic gauze electrically connected to the corona focusing ring 4. In this case, it is important that the metallic gauze to be used possess a mesh size large enough to permit unobstructed passage of the avalanche of ions.

The velocity and volume of the avalanche of ions as it passes the central hole 4a of the corona focusing ring 4 are affected by the shape, particularly the outside diameter, of the corona focusing ring 4, the angle of the inclined face, the diameter of the central hole 4a, etc. and also by the shape of the extremity of the electrode. It is therefore possible to control the cooling operation by setting these factors suitably so as to adjust the velocity and amount of the avalanche of ions as required. Alternatively, the control of the cooling operation can be accomplished by adjusting the magnitude of the resistance R which is interposed between the corona focusing ring 4 and the ground.

An experiment was conducted on the cooling effect of the method of this invention by comparing the edges of cutting tools (with an ultrahigh speed tip) used in heavy-duty cutting work; one cooled by the method of this invention, another cooled by the conventional mere corona discharge method and still another left uncooled. The results are shown in FIG. 2(c) and FIG. 3.

Figure 2:
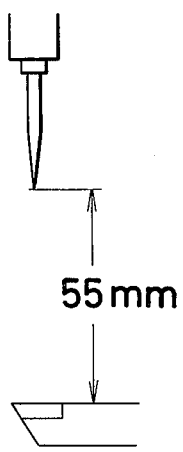
FIG. 2(A) is a diagrammatical representation of a prior art method.
FIG. 2(B) is a similar view to FIG. 2(A) except illustrating the present apparatus.
FIG. 2(C) is a graph comparing the effects of cooling obtained by applying the method of the present invention.
Figure 2:
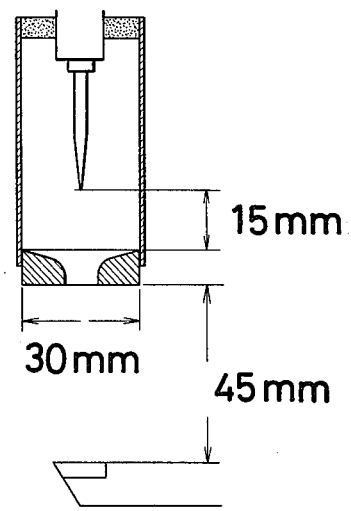
Figure 2:
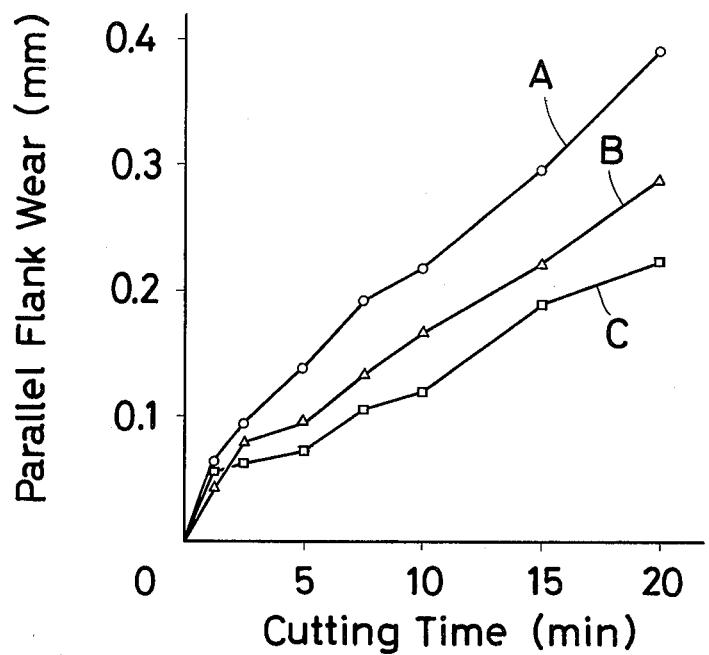

FIG. 2(c) compares the effect of cooling in terms of the extent of wear at the parallel flank of cutting tool. For the cooling by the conventional corona discharge method, the electrode and the cutting tool were disposed as illustrated in FIG. 2(A). In the case of the present invention, they were disposed as shown in FIG. 2(B). The cutting conditions were in all cases 125 m/min in peripheral speed; 0.1 mm/rotation in feed rate and 2mm in cutting depth. The work blank was SNCM8, a nickel-chromium-molybdenum type steel. The corona discharge was effected by an electric potential of 30 KV.

The results were as given in FIG. 2(C). When the cutting was continued in the absence of corona discharge, the wear was about 0.4mm (curve A). When the cutting was made by the conventional corona discharge method, the wear was decreased to about 0.3mm (curve B). When the cutting was performed in the presence of corona discharge effected by the method of this invention, the wear further decreased to about 0.23mm (curve C).

Figure 3:
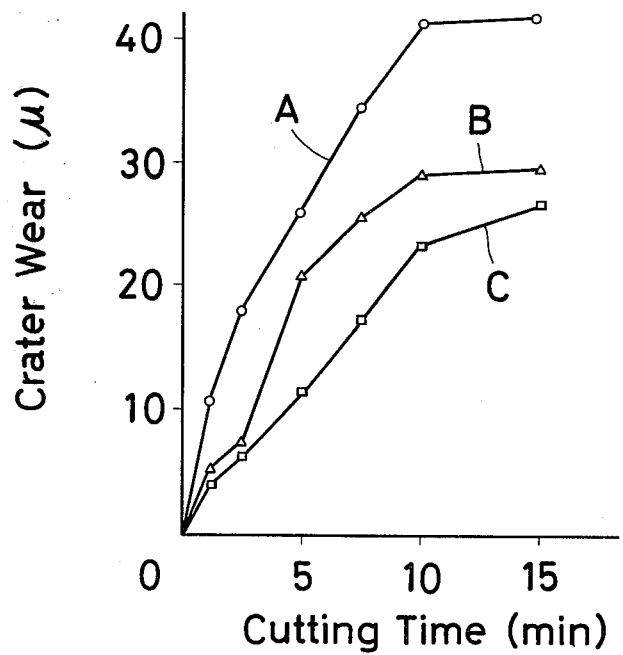
FIG. 3 is a graph comparing the conventional method to cooling of the edges of cutting tools similar to those of FIG. 2(C).

FIG. 3 compares the cooling effect in terms of the extent of wear at the crater of cutting tool. The cutting conditions were the same as those of FIG. 2(A) and FIG. 2(B). In a 15-minute continuous cutting operation, the wear at the crater of the cutting tool during the 5-10 minute interval was extremely small, nearly half as much as when the cutting was performed in the absence of cooling.

As is evident from the foregoing test results, the cooling effected by the corona discharge according to the method of this invention is effective in notably decreasing the extent of the wear of the edge of a cutting tool. The data suggest that the service life of a cutting tool can be increased three to five times of that when the cutting tool is used uncooled. It is also seen that the method of this invention is decidedly more effective than the mere corona discharge method.

As described above, the cooling method according to this invention causes the avalanche of ions generated by corona discharge to be focused and released onto the surface of an article subjected to cooling by virtue of the corona focusing ring and, therefore, improves remarkably the cooling effect. It has been ascertained that the cooling effect of this method is three to five times as high as that which is obtained without using the corona focusing ring. When this cooling method is utilized for cooling the edge of a cutting tool in the course of a cutting operation, for example, it is expected to lengthen the service life of the cutting tool to a great extent, decrease the frequency of cutting tool replacement required because of worn edge and improve the productional efficiency to a marked extent.

What is claimed is:

1. In a method for cooling an article subjected to cooling by utilizing corona discharge caused by placing the article opposite a high-potential electrode and applying high electric potential between the article and the electrode, the improvement which comprises interposing between the article and the high-potential electrode a corona focusing ring possessed of a central hole defining a centrally inclined upper face and applying high electric potential between said electrode and said corona focusing ring and the article subjected to cooling to generate corona discharge therebetween, whereby the avalanche of ions generated in consequence of the corona discharge is focused in the direction of the central hole by the inclined face of said corona focusing ring and released past the central hole onto the article to effect local cooling of the article.

2. A cooling apparatus utilizing corona discharge, which apparatus comprises an electrode disposed opposite an article subjected to cooling, a corona focusing ring interposed between the article and said electrode, said corona focusing ring possessed of a central hole defining a centrally inclined upper face, and means for applying high electric potential to said high-potential electrode, the corona focusing ring and the article subjected to cooling, whereby the avalanche of ions generated in consequence of the corona discharge is focused in the direction of the central hole by the inclined face of said corona focusing ring and released past the central hole onto the article to effect local cooling of the article.

* * * * *